United States Patent
Jaradi et al.

(10) Patent No.: US 10,981,531 B2
(45) Date of Patent: Apr. 20, 2021

(54) PILLAR AIRBAG ASSEMBLY

(71) Applicant: Ford Global Technologies, LLC, Dearborn, MI (US)

(72) Inventors: Dean M. Jaradi, Macomb, MI (US); Mohammad Omar Faruque, Ann Arbor, MI (US); S. M. Iskander Farooq, Novi, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 131 days.

(21) Appl. No.: 16/032,396

(22) Filed: Jul. 11, 2018

(65) Prior Publication Data

US 2020/0017058 A1    Jan. 16, 2020

(51) Int. Cl.
| | |
|---|---|
| *B60R 21/16* | (2006.01) |
| *B60R 21/213* | (2011.01) |
| *B60R 21/2338* | (2011.01) |
| *B60R 21/00* | (2006.01) |
| *B60R 21/231* | (2011.01) |
| *B60N 2/01* | (2006.01) |
| *B60R 21/2165* | (2011.01) |

(52) U.S. Cl.
CPC ........ *B60R 21/213* (2013.01); *B60R 21/2338* (2013.01); *B60N 2/01* (2013.01); *B60R 21/2165* (2013.01); *B60R 2021/0032* (2013.01); *B60R 2021/23107* (2013.01); *B60R 2021/23153* (2013.01); *B60R 2021/23161* (2013.01); *B60R 2021/23386* (2013.01)

(58) Field of Classification Search
CPC . B60R 21/232; B60R 21/214; B60R 21/2338; B60R 2021/23161; B60N 2/143

USPC ........................................................ 280/730.2
See application file for complete search history.

(56) References Cited

U.S. PATENT DOCUMENTS

| | | | | |
|---|---|---|---|---|
| 3,836,168 A | * | 9/1974 | Nonaka | B60R 21/08 280/733 |
| 3,837,422 A | * | 9/1974 | Schlanger | B62D 39/00 280/734 |
| 4,468,051 A | * | 8/1984 | Kobayashi | B60N 2/143 280/751 |
| 5,575,497 A | | 11/1996 | Suyama et al. | |
| 6,059,311 A | * | 5/2000 | Wipasuramonton | B60R 21/23138 280/729 |
| 6,102,436 A | * | 8/2000 | Bayley | B60R 13/0225 280/748 |
| 7,222,877 B2 | | 5/2007 | Wipasuramonton et al. | |
| 7,806,433 B2 | * | 10/2010 | Mitsuo | B60R 13/0225 280/728.2 |
| 9,789,840 B2 | * | 10/2017 | Farooq | B60N 2/14 |
| 9,902,362 B2 | * | 2/2018 | Farooq | B60N 2/01 |
| 10,336,275 B2 | * | 7/2019 | Sundararajan | B60R 21/20 |
| 10,688,955 B2 | * | 6/2020 | Shin | B60R 21/01512 |

(Continued)

FOREIGN PATENT DOCUMENTS

| | | |
|---|---|---|
| DE | 10347847 B3 | 4/2005 |
| JP | 5130856 B2 | 1/2013 |
| JP | 2014181014 A | 9/2014 |

*Primary Examiner* — Toan C To
(74) *Attorney, Agent, or Firm* — Frank A. MacKenzie; Bejin Bieneman PLC (57) ABSTRACT

A vehicle includes a floor, a roof, and a pair of body sides spaced from each other. A pillar is spaced from both of the body sides. The pillar has a first end at the roof and a second end at the floor. An airbag is supported on the pillar.

20 Claims, 8 Drawing Sheets

(56) References Cited

U.S. PATENT DOCUMENTS

2014/0346758 A1* 11/2014 Mueller .............. B60R 21/213
                                                                    280/730.2
2017/0259772 A1    9/2017 Farooq et al.
2018/0065585 A1* 3/2018 Jaradi ................ B60R 21/233
2018/0215338 A1* 8/2018 Faruque ............ B60R 21/2165

* cited by examiner

PILLAR AIRBAG ASSEMBLY

BACKGROUND

A vehicle may include amenities that allow occupants to face one another during operation of the vehicle. As one example, an autonomous vehicle may be autonomously operated, allowing occupants of the vehicle to ride in the vehicle without monitoring the operation of the vehicle. Specifically, the autonomous vehicle may include seats free to rotate during the operation of the vehicle. This may allow the occupants of the seats to face each other and to interact. This may also allow all of the occupants to relax, interact with one another, and focus on vehicle amenities.

DETAILED DESCRIPTION

A vehicle includes a floor, a roof, and a pair of body sides spaced from each other. A pillar is spaced from both of the body sides. The pillar has a first end at the roof and a second end at the floor. An airbag is supported on the pillar.

The airbag may include a pair of legs. The pair of legs may extend in diverging directions in an inflated position.

The airbag may include a vertex at the pillar, and the pair of legs may extend in the diverging directions from the vertex in the inflated position.

The airbag may include a first segment and a second segment. Each of the first segment and the second segment may include a vertex at the pillar and a pair of legs. The pair of legs of each of the first segment and the second segment may extend in diverging directions from the vertex in an inflated position.

One of the legs of the first segment may be adjacent to one of the legs of the second segment.

One of the legs of the first segment may be fixed to one of the legs of the second segment.

The first segment may have an inflation chamber and the second segment may have an inflation chamber disconnected from the inflation chamber of the first segment.

The vehicle may include a first inflator in fluid communication with the first segment and a second inflator in fluid communication with the second segment.

The airbag may include three legs. Each of the three legs may extend in diverging directions from the pillar in an inflated position.

The three legs may share a common inflation chamber.

The airbag in the inflated position may include a plurality of pockets. The plurality of pockets may be spaced from each other circumferentially about the pillar.

The vehicle may include a seat in each of the pockets.

The vehicle may include a first seat and a second seat facing each other, and the airbag may be inflated to an inflated position between the first and second seats.

The vehicle may include a first seat and a second seat facing a common direction, and the airbag may be inflated to an inflated position between the first and second seats.

The roof and the floor may extend from one body side to the other body side.

The vehicle may include an inflator supported by the pillar. The inflator may be in fluid communication with the airbag.

The vehicle may include a tether extending from the roof to the airbag.

The first end of the pillar may be fixed to the roof and the second end of the pillar may be fixed to the floor.

Each of the body sides may include a B-pillar. The pillar may be between the B-pillars.

The vehicle may include a covering. The covering may include a tear seam, and the airbag may be disposed between the pillar and the covering when the airbag is in an uninflated position.

With reference to the Figures, wherein like numerals indicate like parts throughout the several views, a vehicle 10 includes a floor 12, a roof 14, and a pair of body sides 16 spaced from each other. A pillar 18 is spaced from both of the body sides 16. The pillar 18 has a first end 20 at the roof 14 and a second end 22 at the floor 12. An airbag 24, 124 is supported on the pillar 18.

The pillar 18 supports the airbag 24, 124 in an uninflated position. The airbag 24, 124 is inflatable away from the pillar 18 to an inflated position absorb energy from occupants of the vehicle 10 during a vehicle impact. The pillar 18 provides a reaction surface for the airbag 24, 124 when the airbag 24, 124 is impacted by an occupant. Since the pillar 18 is spaced from both of the body sides 16, the pillar 18 and the airbag 24, 124 may be positioned such that the airbag 24, 124 in the inflated position may be impacted by more than one occupant. Since the pillar 18 has the first end 20 at the roof 14 and the second end 22 at the floor 12, the pillar 18 also reinforces the roof 14 for additional strength and rigidity.

The vehicle 10 may be, for example, any type of passenger automobile. The vehicle 10, for example, may be an autonomous vehicle. Specifically, a computer may operate the vehicle 10 in an autonomous mode, a semi-autonomous mode, or a non-autonomous mode. For purposes of this disclosure, an autonomous mode is defined as one in which each of vehicle propulsion, braking, and steering are controlled by the computer; in a semi-autonomous mode the computer controls one or two of vehicles propulsion, braking, and steering; in a non-autonomous mode, a human operator controls the vehicle propulsion, braking, and steering.

The vehicle 10 includes a vehicle body 26 and a vehicle frame (not numbered). The vehicle body 26 and vehicle frame may be of a unibody construction. In the unibody construction, the vehicle body 26, e.g., rockers, serves as the vehicle frame, and the vehicle body 26 (including the rockers, pillars 36, 38, 40, roof rails, etc.) is unitary, i.e., a continuous one-piece unit. As another example, the vehicle body 26 and vehicle frame may have a body-on-frame construction (also referred to as a cab-on-frame construction). In other words, the vehicle body 26 and vehicle frame are separate components, i.e., are modular, and the vehicle body 26 is supported on and affixed to the vehicle frame. Alternatively, the vehicle body 26 and vehicle frame may have any suitable construction. The vehicle body 26 and/or the vehicle frame may be any suitable material, for example, steel, aluminum, etc.

Figure 1:
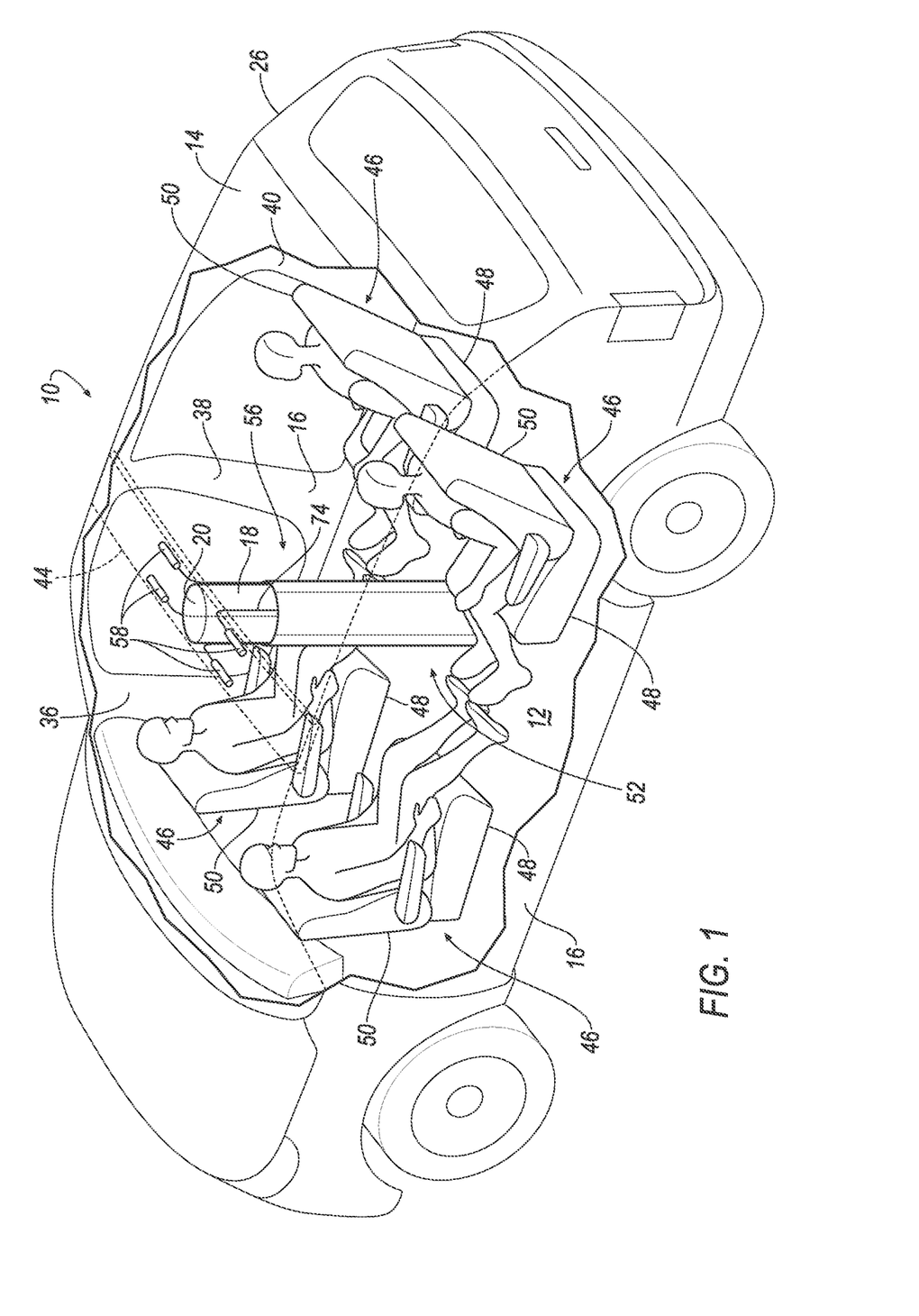
FIG. 1 is a perspective view of a vehicle including pillar and an airbag assembly on the pillar and in an uninflated position.

With reference to FIG. 1, the vehicle body 26 includes the floor 12, the roof 14 and the pair of body sides 16. The vehicle body 26 has a longitudinal axis L. The vehicle body 26 includes a left side 30 and a right side 32 spaced from each other along a cross-vehicle axis A perpendicular to the longitudinal axis L. The left side 30 and the right side 32 may be mirror images of each other about the longitudinal axis L.

One of the body sides 16 may be at the left side 30 of the vehicle body 26, and the other of the body sides 16 may be at the right side 32 of the vehicle body 26. In other words, the body sides 16 are spaced from each other in a cross-vehicle direction. The body sides 16 may be elongated along the longitudinal axis L.

Each of the pair of body sides 16 may include pillars, e.g., an A-pillar 36, a B-pillar 38, a C-pillar 40, etc. The B-pillar 38 is between the A-pillar 36 and the C-pillar 40 along the longitudinal axis L.

With continued reference to FIG. 1, the floor 12 extends from the left side 30 to the right side 32 of the body. Specifically, the floor 12 extends from one body side 16 to the other body side 16. The floor 12 is fixed relative to the body sides 16, e.g., directly or indirectly through an intermediate component.

The roof 14 extends from the left side 30 to the right side 32. Specifically, the roof 14 extends from one body side 16 to the other body side 16. The roof 14 may include a roof panel 42 and at least one roof beam 44. The roof beam 44 is elongated in a cross-vehicle direction. Both the roof panel 42 and the roof beam 44 may extend from one body side 16 to the other body side 16.

The vehicle 10 includes one or more seats 46. In the examples shown in the figures, the vehicle 10 includes four seats 46, and the vehicle 10 may include any suitable number of seats 46, e.g., one or more. The seats 46 are supported by the floor 12.

With continued reference to FIG. 1, each seat 46 may include a seat bottom 48 and a seat back 50. The seat back 50 may be supported by the seat bottom 48 and may extend upwardly from the seat bottom 48. The seat back 50 may be stationary or moveable relative to the seat bottom 48, e.g., the seat back 50 may recline relative to the seat bottom 48.

The seat 46 may be rotatable relative to the floor 12 about an axis transverse to the floor 12. Each of the seats 46 may be rotatable relative to the floor 12 independently of each other. As one example, in configurations where the vehicle 10 is autonomous, during autonomous operation of the vehicle 10, the seats 46 may be rotated, e.g., to face each other such that the occupants can face each other and interact. As one example, the seat 46 may be rotatably coupled to the floor 12. For example, the seat 46 may include a mounting post (not shown) rotatably coupling the seat 46 to the floor 12. As one example, the mounting post is coupled to the seat bottom 48 and extends from the seat bottom 48 to the floor 12 to support the seat 46 on the floor 12. The mounting post may be rotatable relative to the floor 12 and/or relative to the seat bottom 48. The seat 46 may be rotatable relative to the floor 12 in any suitable degree of rotation, e.g., 360 degrees. As another example, the seats 46 may be in a fixed position relative to the floor 12. Whether rotatable relative to the floor 12 or fixed relative to the floor 12, the seats 46 may be arranged in any suitable arrangement. As an example, as set forth above, two of the seats 46 may face each other, i.e., the seat bottoms 48 extend toward each other from the respective seat backs 50. As another example, two seats 46 may face a common direction, i.e., the seat bottoms 48 extend in a common direction from the respective seat backs 50.

The vehicle body 26 defines an interior 52 of the vehicle 10. Specifically, the floor 12, the roof 14 and the body sides 16 define the interior 52 of the vehicle 10. The pillar 18 is disposed in the interior 52 of the vehicle 10. The periphery of the pillar 18 is spaced in a cross-vehicle direction from other components of the interior 52. Specifically, the pillar 18 is spaced from the body sides 16 and other interior components such as the doors, seats 46, dash, etc. The pillar 18 is spaced from the A-pillars 36, the B-pillars 38, and the C-pillars 40.

With continued reference to FIG. 1, the pillar 18 may be vertical. The pillar 18 has the first end 20 at the roof 14 and the second end 22 at the floor 12. The first end 20 of the pillar 18 may be fixed to the roof 14 and the second end 22 of the pillar 18 may be fixed to the floor 12. As an example, the first end 20 of the pillar 18 may be fixed to roof beam 44. As another example, the second end 22 of the pillar 18 may be fixed to a floor beam (not shown) or a panel (not numbered) of the floor 12. The first end 20 and the second end 22 of the pillar 18 may be fixed to the roof 14 and the floor 12, respectively, in any suitable way including fastening, and/or welding, etc.

The pillar 18 is elongated from the first end 20 to the second end 22. The pillar 18 may be cylindrical, as shown in the figures, or may be any suitable shape. The pillar 18 may include a cavity 54, e.g., extending from the first end 20 to the second end 22, or the pillar 18 may be solid. The pillar 18 may be metal (e.g., steel, aluminum, etc.), plastic (e.g., fiber reinforced plastic, etc.) or any other suitable material.

The vehicle 10 includes an airbag assembly 56. The airbag assembly 56 includes the airbag 24, 124 and at least one inflator 58. The airbag assembly 56 may include at least one housing that houses the airbag 24, 124 in the uninflated position and supports the airbag 24, 124 in the inflated position.

As one example, as shown in FIGS. 2-4B, the airbag 24 may include more than one segment 60 each having an inflation chamber (not numbered) disconnected from the inflation chambers of the other segments 60, i.e., independent inflation chambers. As another example, as shown in FIGS. 5-7B, the airbag 124 may have a single inflation chamber. Common numerals are used to identify common features in the examples shown in FIGS. 2-4B and the examples shown in FIGS. 5-7B.

The airbag 24, 124 may include a vertex 64 at the pillar 18 and a pair of legs 66. The vertex 64 may be fixed relative to the pillar 18. The legs 66 extend in diverging directions from the vertex 64 in the inflated position. In other words, the legs 66 extend along directions that intersect at the vertex 64. The legs 66 may meet at the vertex 64. For example, the legs 66 may extend away from the vertex 64 in a V-shape. In the inflated position, the legs 66 extend from the vertex 64 away from the pillar 18. The legs 66 may extend radially relative to the pillar 18. The pillar 18 provides a reaction surface for the airbag 24, 124 in the inflated position.

The airbag 24, 124 may include any suitable number of vertices 64 and pairs of legs 66, with both legs 66 of each of the pair meeting at one vertex 64. In the example shown in FIG. 2, each segment 60 includes one vertex 64 and one pair of legs 66 extending from the vertex 64. In the example shown in FIG. 5, the airbag 124 has four vertices 64 and four legs 66 with two legs 66 paired at each vertex 64.

Figure 2:
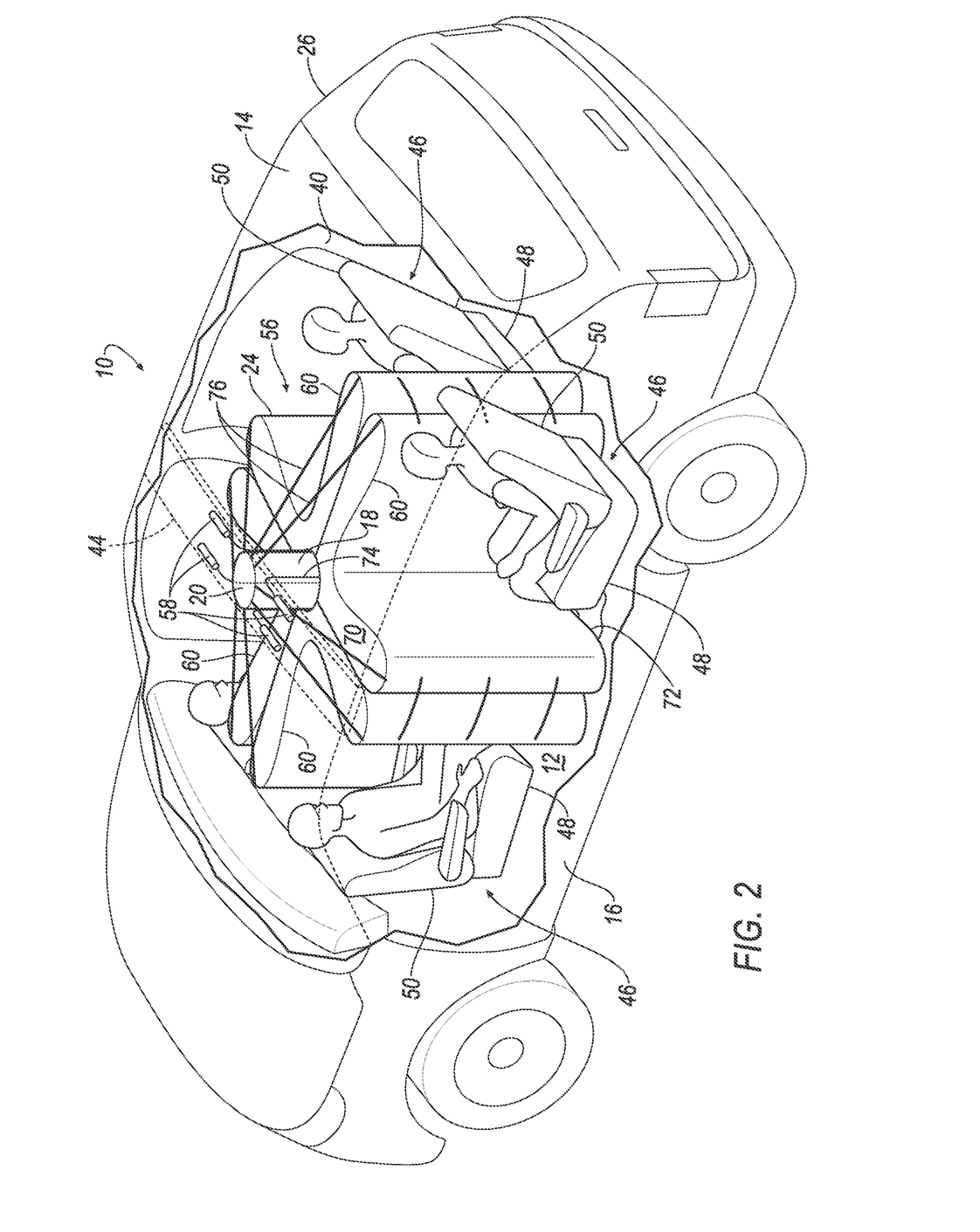
FIG. 2 is a perspective view of the vehicle including the airbag assembly in an inflated position.
Figure 5:
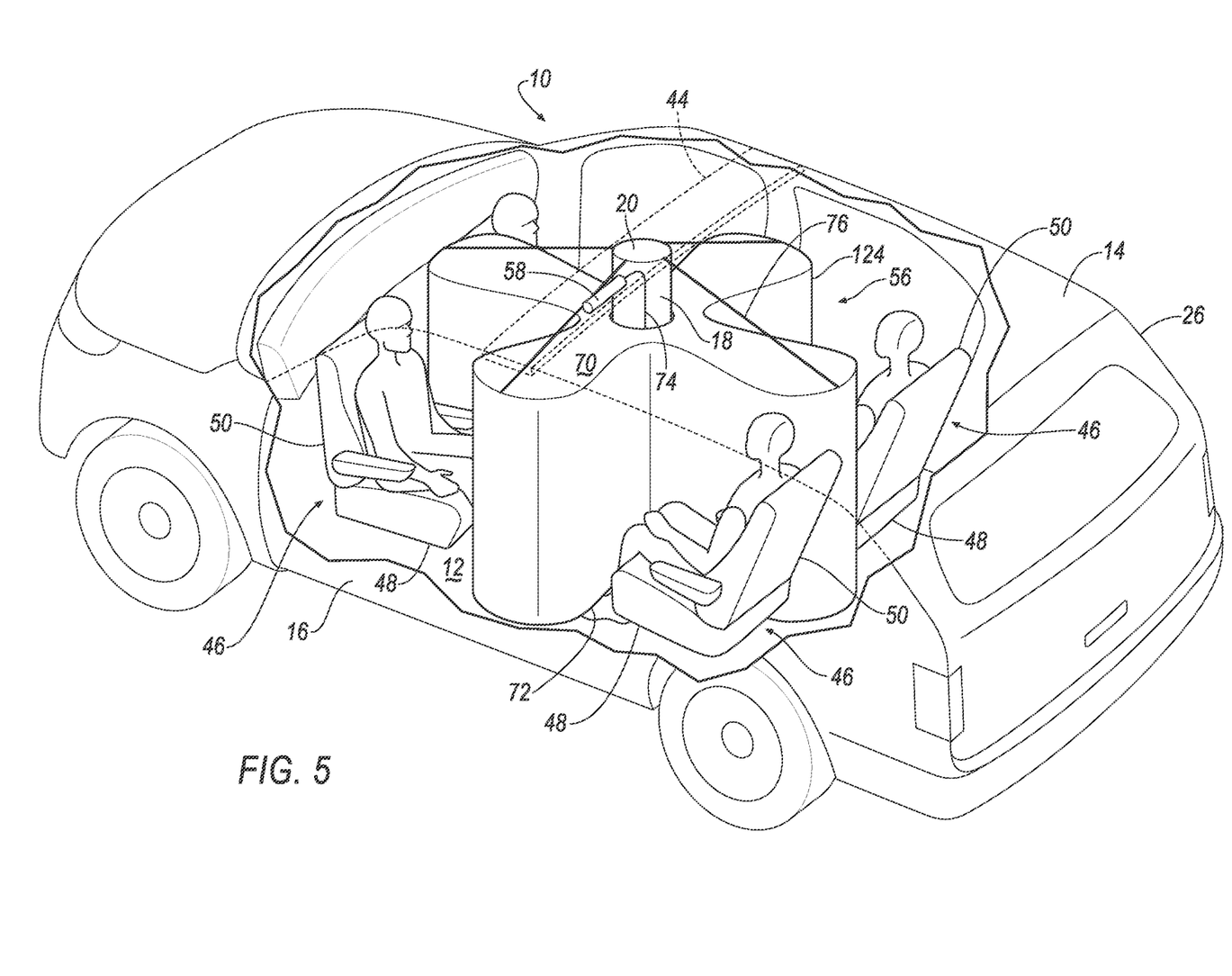
FIG. 5 is a perspective view of the vehicle including another example of the airbag assembly in the inflated position.

With reference to FIGS. 2 and 5, in the inflated position, the vertices 64 and the legs 66 of the airbag 24, 124 may be elongated along the pillar 18, e.g., elongated vertically. In the inflated position, the vertices 64 and/or the legs 66 may be spaced from the roof 14 and/or the floor 12 or the vertices 64 and/or the legs 66 may abut the roof 14 and/or the floor 12.

The airbag 24, 124 includes at least one pocket 68 in the inflated position. At least one seat 46 is in the pocket 68. The pocket 68 may be V-shaped, as shown in the figures, or may have any suitable shape. The pocket 68 may be open at a top 70 and a bottom 72 of the airbag 24, 124, e.g., at the first end 20 and the second end 22 of the pillar 18.

As an example, the airbag 24, 124 may include a plurality of pockets 68. In such an example, one seat 46 is in each pocket 68, and the legs 66 separate the seats 46 from each other. The plurality of pockets 68 may be spaced from each other circumferentially about the pillar 18. In such an example, the seats 46 may be spaced generally circumferentially about the pillar 18.

The airbag 24, 124 may be of any suitable material, e.g., woven polymer. For example, the airbag 24, 124 may be of woven nylon yarn, such as nylon 6. Other suitable examples include polyether ether ketone (PEEK), polyetherketoneketone (PEKK), polyester, or any other suitable polymer. The woven polymer may include a coating such as silicone, neoprene, urethane, polyorganosiloxane, etc.

As set forth above, the airbag assembly 56 includes at least one inflator 58. The inflator 58 is in fluid communication with the airbag 24, 124 and inflates the airbag 24, 124 from the uninflated position to the inflated position. Specifically, the inflator 58 provides an inflation medium to an inflation chamber of the airbag 24, 124 to inflate the airbag 24, 124. The inflator 58 may be, for example, a pyrotechnic inflator that uses a chemical reaction to drive an inflation medium into the airbag 24, 124. As another example, the inflator 58 may be a cold-gas inflator that, when activated, ignites a pyrotechnic charge that creates an opening for releasing the pressurized inflation medium to the airbag 24, 124. Alternatively, the inflator 58 may be of any suitable type, for example, a hybrid inflator. The inflator 58 may be connected to the inflation chamber with a fill tube 74, as shown in the figures, or may be directly connected to the inflation chamber.

The airbag assembly 56 may include any suitable number of inflators 58. For example, the airbag assembly 56 may include more than one inflator 58, as shown in FIGS. 1-4B, or may include one inflator 58, as shown in FIGS. 5-7B. Whether the airbag assembly 56 includes one or more inflators 58, the inflator 58 may be mounted to the roof 14, e.g., to the roof beam 44, or may be supported by the pillar 18. For example, the inflator 58 may be mounted to the pillar 18, e.g., on an exterior of the pillar 18 or in the cavity 54 of the pillar 18. When mounted on an exterior of the pillar 18, the pillar 18 may include one or more recesses that receive the inflator(s) 58.

As set forth above, with reference to FIGS. 1-4B, the airbag 24 may include a plurality of segments 60. The inflation chambers of the segments 60 are disconnected from each other. In other words, the inflation chamber of one segment 60 is not in fluid communication with the inflation chamber of another segment 60, i.e., in the inflated position, fluid in the inflation chamber of one segment 60 does not intermix with fluid in the inflation chamber of another segment 60.

With continued reference to FIGS. 1-4B, one of the legs 66 of the one segment 60 is adjacent to one of the legs 66 of another segment 60. In other words, in the examples shown in FIGS. 1-4B, each leg 66 is adjacent one leg 66 of another one of the segments 60. Specifically, each leg 66 abuts one leg 66 of another one of the segments 60 to act a reaction surface for each other.

With continued reference to FIGS. 1-4B, adjacent ones of the segments 60 may be fixed to each other. For example, abutting ones of the legs 66 may be fixed to each other. In such an example, the two legs 66 may be fixed to each other by any suitable way including stitching, glue, straps, etc.

Figure 3:
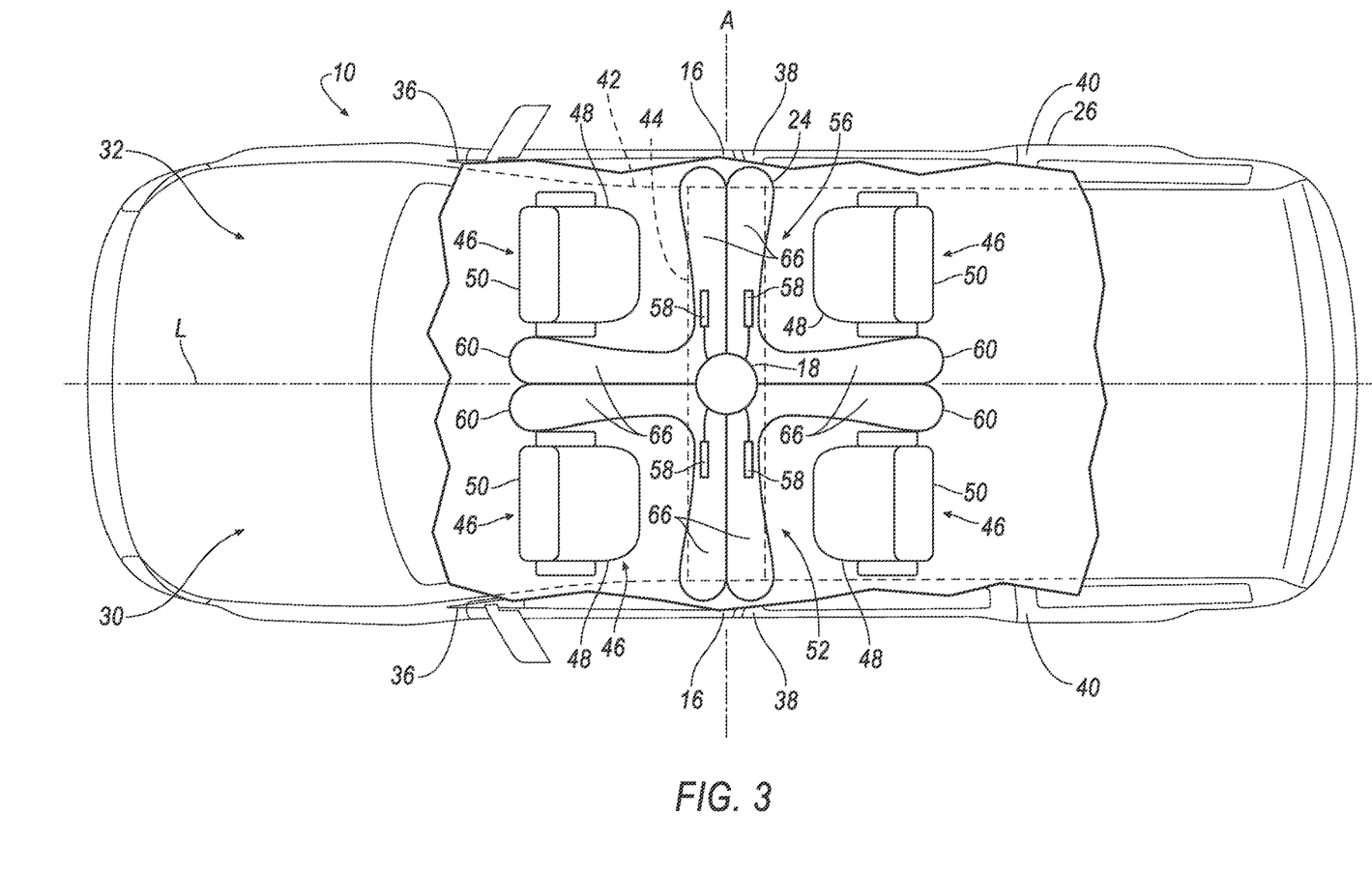
FIG. 3 is a top view of the vehicle including the airbag assembly in the inflated position.
Figure 4A:
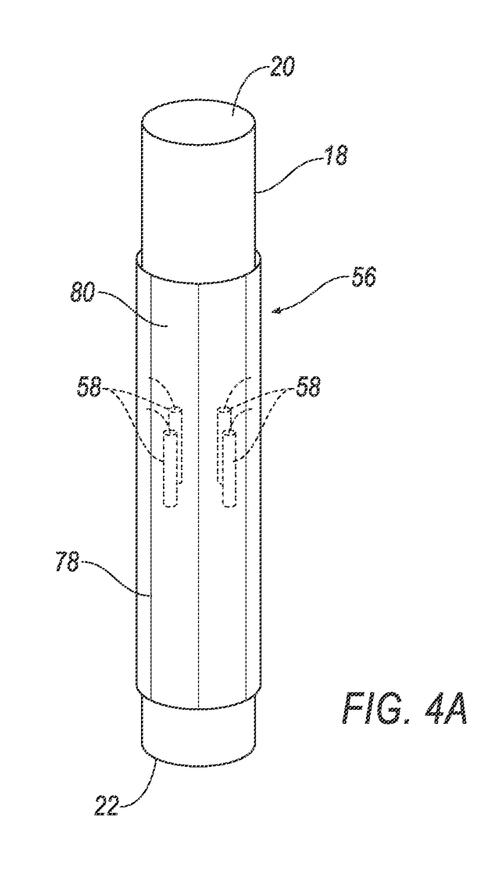
FIG. 4A is a perspective view of another example of the pillar and the airbag assembly.
Figure 4B:
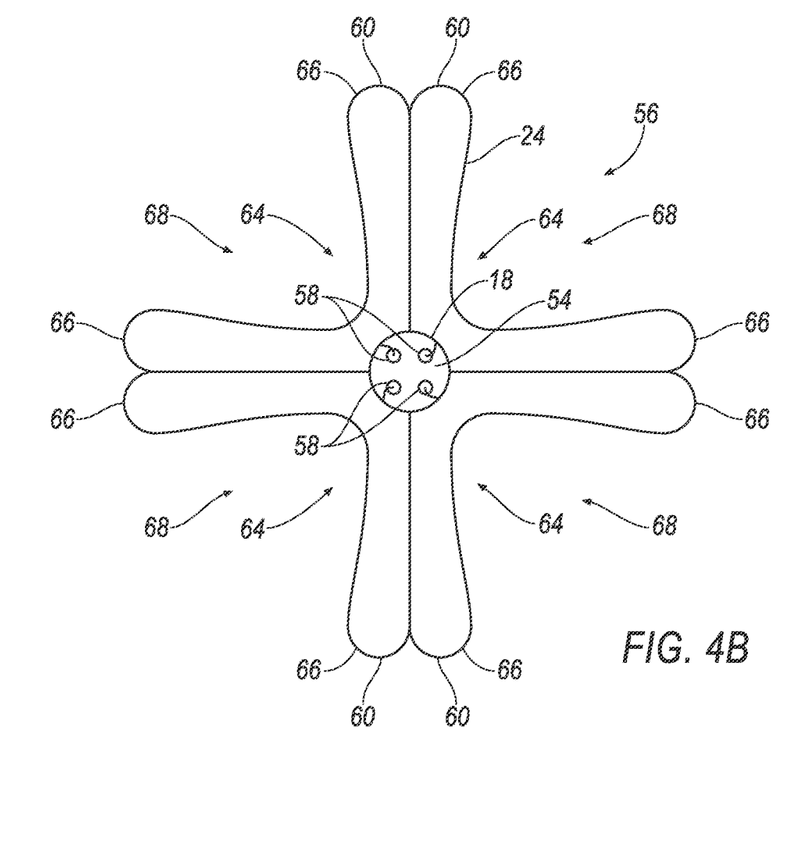
FIG. 4B is a top view of the pillar and the airbag assembly of FIG. 4A.

With reference to FIGS. 1-4B, one inflator 58 may be connected to each segment 60, respectively. For example, as shown in FIGS. 1-3, the inflators 58 may be mounted to the roof 14, e.g., to the roof beam 44. As another example, as shown in FIGS. 4A-4B the inflators 58 may be supported by the pillar 18, e.g., mounted to the pillar 18. Alternatively, the airbag assembly 56 may have any suitable number of inflators 58 with more than one of the segments 60 sharing one inflator 58.

With reference to FIGS. 5-7B, all legs 66 of the airbag 124 may share a common inflation chamber. In other words, the airbag 124 includes one, single inflation chamber that extends through all vertices 64 and legs 66. Inflation medium is in fluid communication with all vertices 64 and legs 66.

Figure 6:
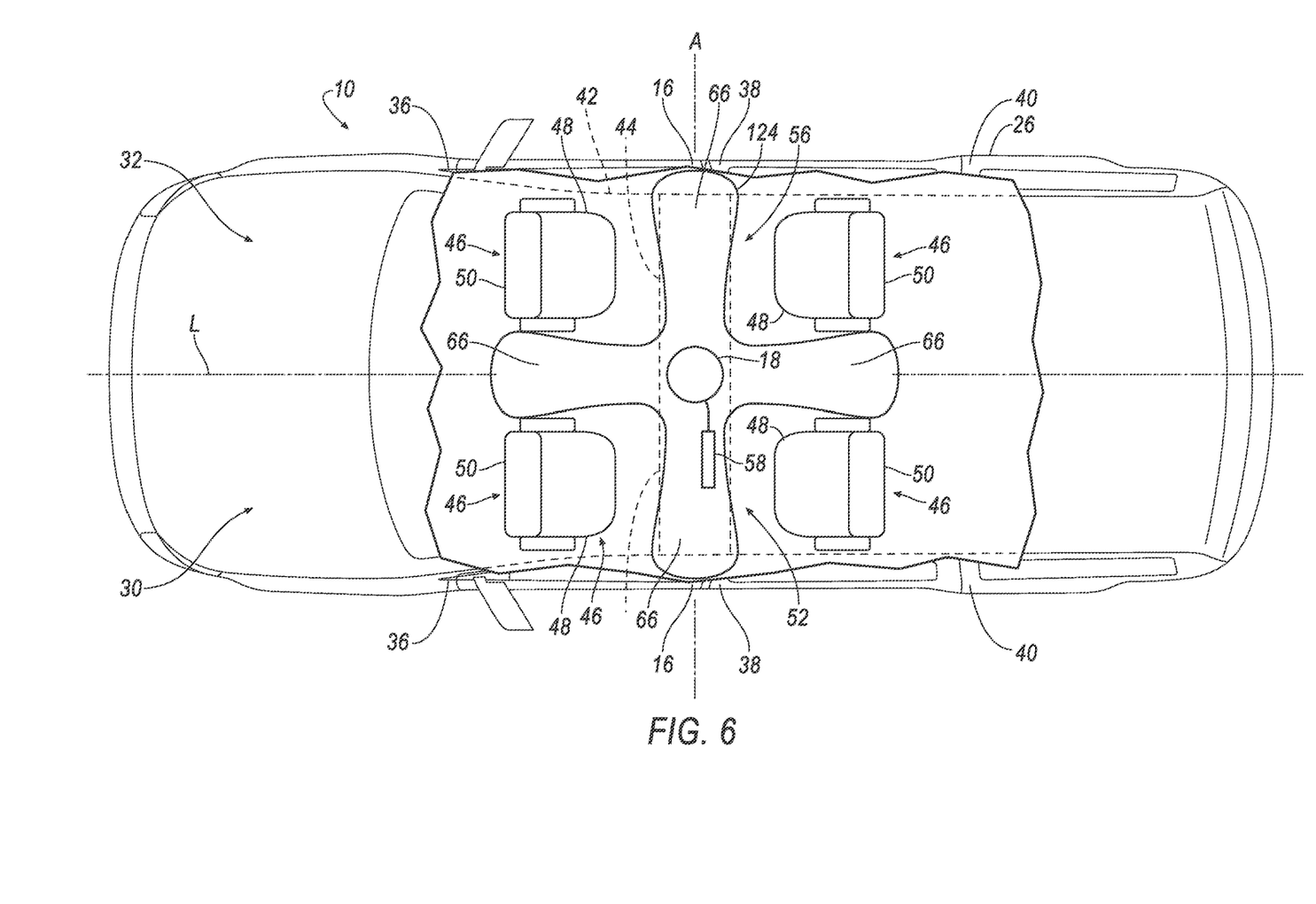
FIG. 6 is a top view of the vehicle including the airbag assembly of FIG. 5.
Figure 7A:
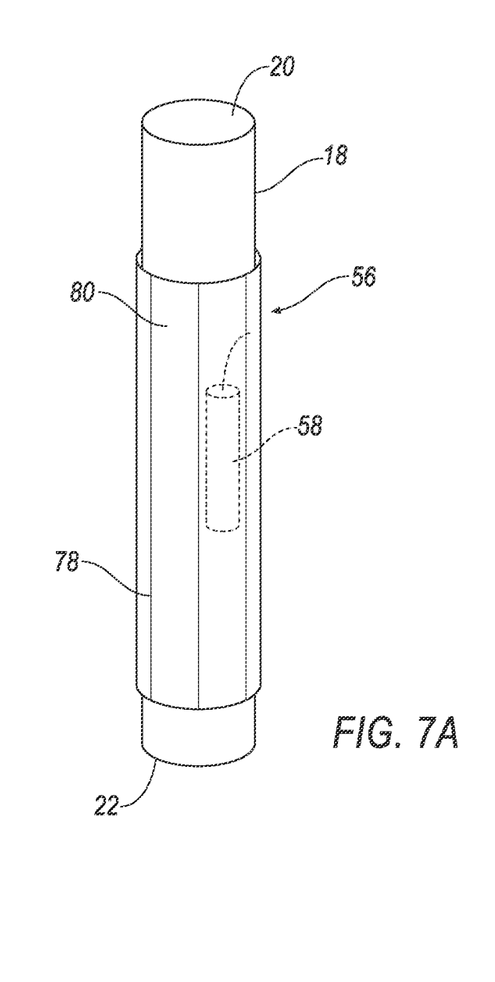
FIG. 7A is a perspective view of another example of the pillar and the airbag assembly.
Figure 7B:
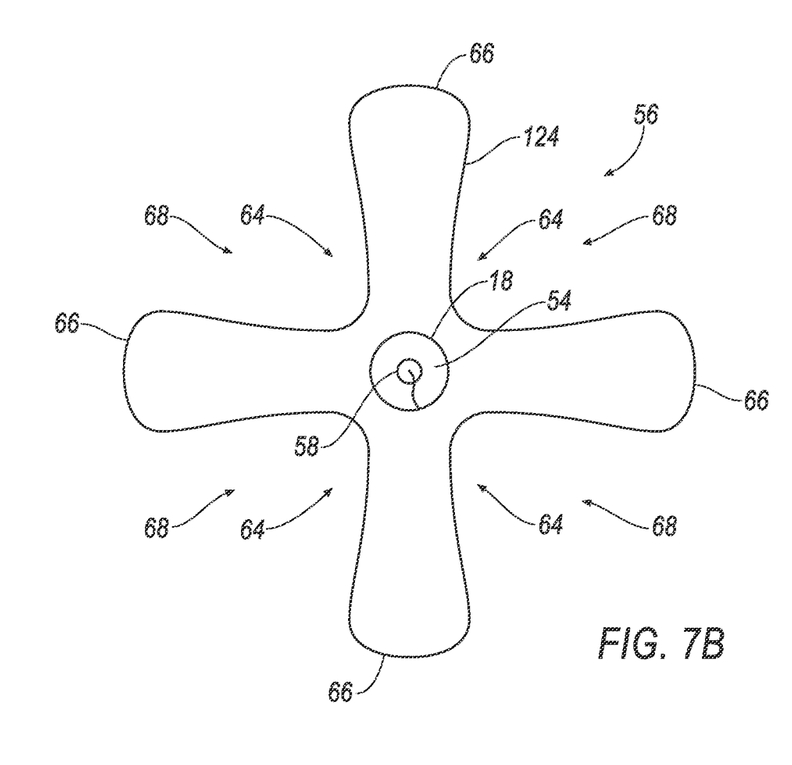
FIG. 7B is a top view of the pillar and the airbag assembly of FIG. 7A

With reference to FIGS. 5-7B, one inflator 58 may inflate the airbag 124, i.e., all vertices 64 and legs 66. For example, as shown in FIGS. 5-6, the inflator 58 may be mounted to the roof 14, e.g., to the roof beam 44. As another example, as shown in FIGS. 7A-7B the inflator 58 may be supported by the pillar 18, e.g., mounted to the pillar 18. Alternatively, the airbag assembly 56 may include more than one inflator 58 that simultaneously provide inflation medium to the common inflation chamber.

With reference to FIGS. 2 and 5, the airbag assembly 56 may include a tether 76. The tether 76 may extend from the roof 14 or the pillar 18 to one leg 66 of airbag 24, 124. The tether 76 is fixed to the roof 14/pillar 18 and the leg 66 of the airbag 24, 124 to position the leg 66 of the airbag 24, 124 in the inflated position. The airbag assembly 56 may include any suitable number of tethers 76. As one example shown in FIGS. 2 and 5, the airbag assembly 56 may include a tether 76 for each leg 66, i.e., eight tethers 76 in the example shown in FIG. 2 and four tethers 76 in the example shown in FIG. 5. The tethers 76 are not shown in FIGS. 3 and 6 for illustrative purposes. In the uninflated position, the tether 76 may be concealed in the roof 14 or the pillar 18, and may break therefrom, e.g., through a tear seam 78, upon inflation of the airbag 24, 124.

With reference to FIGS. 4A and 7A, the airbag assembly 56 may include a covering 80. The airbag 24, 124 may be disposed between the pillar 18 and the covering 80 when the airbag 24, 124 is in the uninflated position. The covering 80 may include a tear seam 78, and the airbag 24, 124 may break the tear seam 78 as the airbag 24, 124 inflates to the inflated position. The tear seam 78 may be an area of weak material, a perforated area, etc., that encourages the covering 80 to tear along the tear seam 78 when the airbag 24, 124 inflates.

Figure 8:
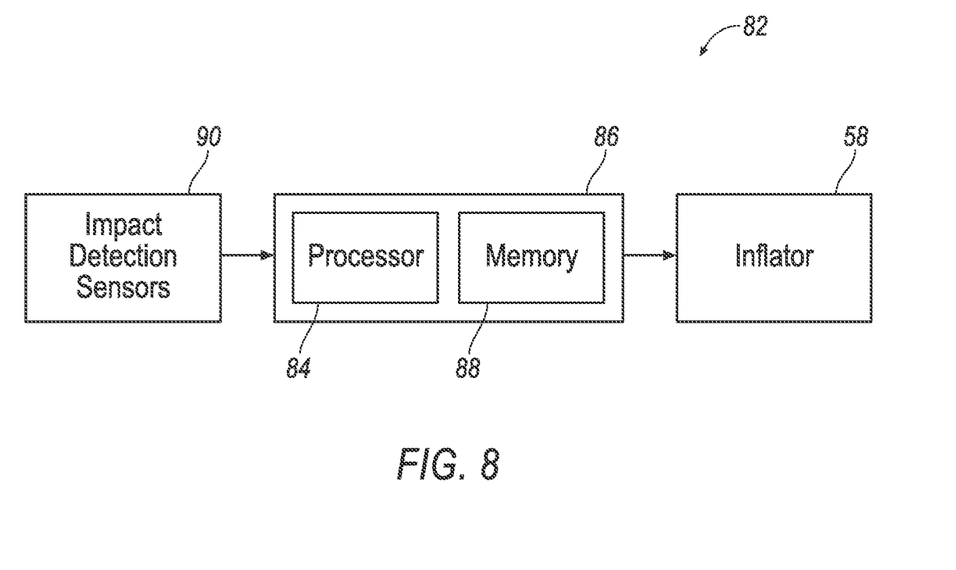
FIG. 8 is a block diagram of an inflation system of the vehicle.

With reference to FIG. 8, the vehicle 10 may include an inflation system 82. The inflation system 82 includes a processor 84 programmed to initiate an inflation of the airbag 24, 124 in response to the vehicle impact. The processor 84 may be embedded in a microcontroller 86. The microcontroller 86 may include memory 88, etc. The memory 88 of the microcontroller 86 may store instructions executable by the processor 84 and the processor 84 may read the instructions from the memory 88 and execute the instructions.

The vehicle 10 may include impact detection sensors 90 programmed to detect the vehicle impact to the vehicle body 26. The impact detection sensors 90 may be disposed in the vehicle body 26 or elsewhere in the vehicle 10. The impact detection sensors 90 may be of various types, e.g., pressure sensor, acceleration sensor, vision sensor, etc. When the vehicle impact occurs, the processor 84 may receive one or more signals from the impact detection sensors 90 indicating the vehicle impact. In response to receiving the signals from the impact detection sensors 90, the processor 84 may initiate the inflation of the airbag 24, 124. Alternatively, the processor 84 may initiate the inflation of the airbag 24, 124 selectively based on information from the impact detection sensors 90 identifying the physical characteristics of the vehicle impact, e.g., which side of the vehicle 10 impacted, amount of pressure applied to the vehicle body 26, etc. and also seat occupancy information, e.g., by using the occupancy sensors disposed inside the seats 46 sensing the occupancy status of the seats 46.

In order to receive the signals from the impact detection sensors 90 and to initiate the inflation of the airbag 24, 124, the processor 84 communicates with the impact detection sensors 90 and the inflator 58, e.g., through a direct electrical wiring, through which an analog or a digital signal is transmitted, or through a communication network like CAN (Control Area Network), Ethernet, LIN (Local Interconnect Network) or any other way.

In operation, the airbag assembly 56 is in the uninflated position, as shown in FIG. 1, under normal operating conditions of the vehicle 10. When the impact detection sensors 90 sense an impact of the vehicle 10, the processor 84 triggers the inflator(s) 58 to inflate the airbag 24, 124 with the inflation medium from the uninflated position to the inflated position. In the inflated position, the legs 66 form the pocket 68 and the seats 46 are in the pockets 68. As the occupants move within the vehicle 10 due to the momentum of the vehicle impact, legs 66 separate the occupants from each other. The airbag 24, 124, i.e., the legs 66 and/or the vertices 64, and absorb energy from the occupants as the occupants impact the airbag 24, 124. The pillar 18 acts as a reaction surface for the airbag 24, 124 as the occupants impact the airbag 24, 124. The airbag 24, 124 may absorb energy from the head and upper torso of the occupant, and may receive the legs and knees of the occupant to encourage the occupant to remain upright. The pair of legs 66 may retain the occupant within the pocket 68.

The disclosure has been described in an illustrative manner, and it is to be understood that the terminology which has been used is intended to be in the nature of words of description rather than of limitation. The numerical adjectives "first," "second," etc., are used herein as identifiers and do not indicate order or importance. Many modifications and variations of the present disclosure are possible in light of the above teachings, and the disclosure may be practiced otherwise than as specifically described.

What is claimed is:

1. A vehicle comprising:
   a floor, a roof, and a pair of body sides spaced from each other;
   a pillar spaced from both of the body sides, the pillar having a first end at the roof and a second end at the floor;
   an airbag supported on the pillar; and
   a covering including a tear seam, the airbag being disposed between the pillar and the covering when the airbag is in an uninflated position;
   the airbag in an inflated position including a plurality of pockets spaced from each other circumferentially about the pillar.

2. The vehicle as set forth in claim 1, wherein the airbag includes a pair of legs extending in diverging directions in an inflated position.

3. The vehicle as set forth in claim 2, wherein the airbag includes a vertex at the pillar and the pair of legs extend in the diverging directions from the vertex in the inflated position.

4. The vehicle as set forth in claim 1, wherein the airbag includes a first segment and a second segment each including a vertex at the pillar and a pair of legs extending in diverging directions from the vertex in an inflated position.

5. The vehicle as set forth in claim 4, wherein one of the legs of the first segment is adjacent to one of the legs of the second segment.

6. The vehicle as set forth in claim 4, wherein one of the legs of the first segment is fixed to one of the legs of the second segment.

7. The vehicle as set forth in claim 4, wherein the first segment has an inflation chamber and the second segment has an inflation chamber disconnected from the inflation chamber of the first segment.

8. The vehicle as set forth in claim 1, wherein the airbag includes three legs each extending in diverging directions from the pillar in an inflated position.

9. The vehicle as set forth in claim 8, wherein the three legs share a common inflation chamber.

10. The vehicle as set forth in claim 1, further comprising a seat in each of the pockets.

11. The vehicle as set forth in claim 1, further comprising a first seat and a second seat facing each other, and the airbag being inflated to an inflated position between the first and second seats.

12. The vehicle as set forth in claim 1, further comprising a first seat and a second seat facing a common direction, the airbag being inflated to an inflated position between the first and second seats.

13. The vehicle as set forth in claim 1, wherein the roof and the floor extend from one body side to the other body side.

14. The vehicle as set forth in claim 1, further comprising an inflator supported by the pillar and in fluid communication with the airbag.

15. The vehicle as set forth in claim 1, further comprising a tether extending from the roof to the airbag.

16. The vehicle as set forth in claim 1, wherein the first end of the pillar is fixed to the roof and the second end of the pillar is fixed to the floor.

17. The vehicle as set forth in claim 1, wherein the body sides each include a B-pillar, and the pillar is between the B-pillars.

18. A vehicle comprising:
    a floor, a roof, and a pair of body sides spaced from each other;

a pillar spaced from both of the body sides, the pillar having a first end at the roof and a second end at the floor;

an airbag supported on the pillar; and a covering including a tear seam, the airbag being disposed between the pillar and the covering when the airbag is in an uninflated position;

the body sides each including a B-pillar, and the pillar is between the B-pillars.

19. A vehicle comprising:

a floor, a roof, and a pair of body sides spaced from each other;

a pillar spaced from both of the body sides, the pillar having a first end at the roof and a second end at the floor;

an airbag supported on the pillar; and a covering including a tear seam, the airbag being disposed between the pillar and the covering when the airbag is in an uninflated position;

the airbag including a pair of legs extending in diverging directions in an inflated position.

20. The vehicle as set forth in claim 19, wherein the airbag includes a vertex at the pillar and the pair of legs extend in the diverging directions from the vertex in the inflated position.

* * * * *